United States Patent [19]

Wedman

[11] 3,995,895
[45] Dec. 7, 1976

[54] FORAGE BOX

[76] Inventor: Martin Wedman, General Delivery, New Fish Creek, Alberta, Canada, T0H 2S0

[22] Filed: Feb. 3, 1975

[21] Appl. No.: 546,603

[52] U.S. Cl. .............................. 298/22 R; 296/55
[51] Int. Cl.² ........................................ B62D 63/06
[58] Field of Search ............ 298/22 R, 17 R, 17 B; 296/55

[56] References Cited
UNITED STATES PATENTS

| | | | |
|---|---|---|---|
| 2,718,431 | 9/1955 | Pietroroia | 296/55 X |
| 3,771,829 | 11/1973 | Breazeale | 298/22 R |

FOREIGN PATENTS OR APPLICATIONS 1,177,950   9/1964   Germany ..................... 296/17 R Primary Examiner—Philip Goodman
Attorney, Agent, or Firm—Stanley G. Ade

[57] ABSTRACT

A two wheeled forage box is towed behind a harvesting machine and collects chaff silage or green chop and the like. When full it may be elevated around a hinge point so that it can be dumped into a truck. It has an overhang at the back which helps level the load in the truck and a gravity operated hinged rear door assembly which opens when the box is elevated by a pair of hydraulic piston and cylinder assemblies.

8 Claims, 5 Drawing Figures

FORAGE BOX

BACKGROUND OF THE INVENTION

When threshing grain, it is often desirable to collect the chaff which is separated from the grain by the harvesting operation as such chaff has considerable food value for cattle.

Although the present device is directed to a means for collecting said chaff, nevertheless it is to be understood that it can be utilized for the collection of any such material and the discharge thereof into another vessel.

Conventionally such chaff is blown into a collecting box mounted on a trailer pulled behind the harvesting machine. When full this box is elevated and dumped into a further vessel such as a truck which may be driven alongside. This permits the harvesting operation to continue uninterrupted as the forage box is being filled while the truck is transporting the last load to a convenient storage location.

Considerable difficulty is experienced in providing an efficient rigid, heavy-duty forage box assembly which furthermore can be dumped readily and easily into a truck without considerable hand shovelling in order to spread the load within the truck and to ensure that the entire contents of the forage box are discharged.

SUMMARY OF THE INVENTION

The present device overcomes disadvantages of existing equipment by providing a frame towed behind a harvesting machine and having a sloping upper side. A forage box is pivotally mounted to the frame and normally lies with the floor of the forage box inclining forwardly and downwardly so that forage such as chaff or the like blows into the box and gravitates towards the front thereof during loading. When it is desired to discharge the contents of the forage box, hydraulic piston and cylinder assemblies elevate the box around a horizontal pivot which is situated inboard from the rear of the floor of the box. The overhanging portion of the floor thus formed is useful, firstly, in ensuring that the contents of the forage box are dumped into the truck or the like and secondly, to spread the load within the truck by forward and rearward movement of the forage box assembly by the towing vehicle.

Another object of the invention is to provide a device of the character herewithin described which includes a hinged door assembly for the rear discharge side which opens automatically when the load commences to discharge and close automatically by gravity when the forage box is lowered thus eliminating the requirement of any catches or latches, particularly in view of the fact that the floor of the box inclines forwardly and downwardly when in the lowermost position.

A still further object of the invention is to provide a device of the character herewithin described which is simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept.

DESCRIPTION OF THE DRAWINGS

In the drawings like characters of reference indicate corresponding parts in the different figures.

DETAILED DESCRIPTION

Figure 1:
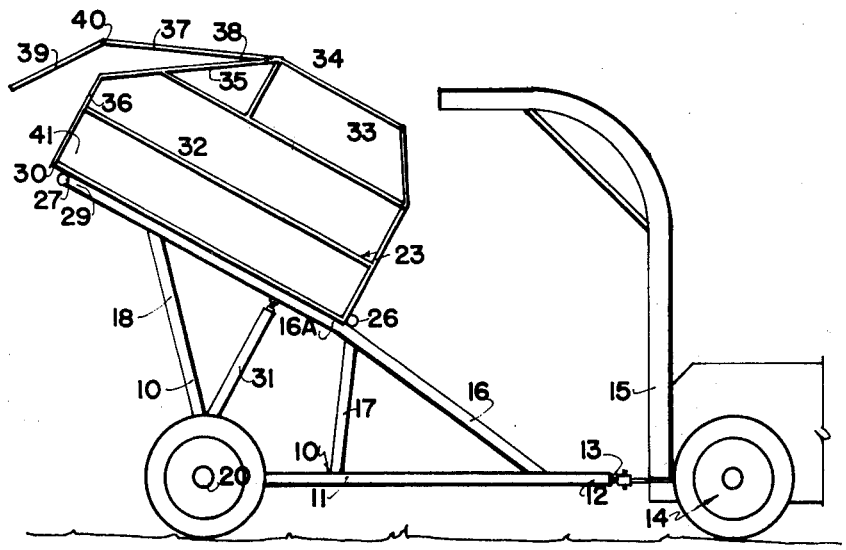
FIG. 1 is a side elevation of the device in the lowermost position.
Figure 2:
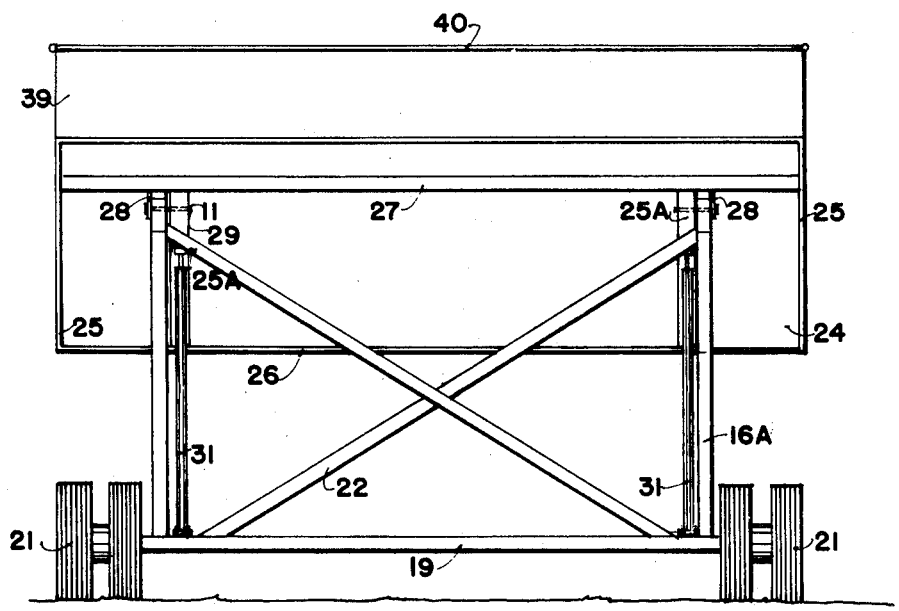
FIG. 2 is an end view taken from the left hand side of FIG. 1.
Figure 2A:
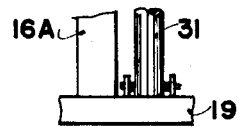
FIG. 2A is an enlarged fragmentary view showing the connection of the lower end of one of the rams to the lower cross member.
Figure 2B:
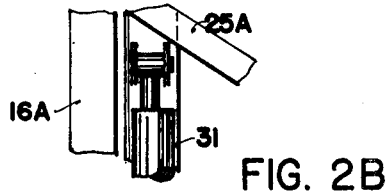
FIG. 2B is an enlarged fragmentary view showing the connection of the upper end of one of the rams to the box.

Proceeding therefore to describe the invention in detail, reference should be made to the accompanying drawings in which it will be seen that I have provided a pipe frame generally designated 10. This frame consists of a pair of side members 11 converging to a common apex at the forward end 12 thereof upon which is formed a conventional hitch assembly 13 for attachment to the rear end of a harvesting device shown fragmentary and indicated by reference character 14. This harvesting device consists of a blower spout 15 which extends upwardly and rearwardly for the discharge of chaff and the like into the forage box assembly.

The frame 10 includes a pair of upwardly and rearwardly extending frame members 16 which are supported by substantially vertical braces 17 upon the lower members 11 but spaced upwardly therefrom. These members 16 then extend rearwardly in parallel relationship and these rearwardly extending portions are identified by reference character 16A and it will be noted that the angle of inclination of portions 16A is slightly less than the angle of inclination of the main portions 16. A cross member (not illustrated) extends between the junctions of portions 16 and 16A for strengthening purposes and further substantially vertical portions 18 extend from inboard the rear ends of the members 16A, downwardly to a lower rear cross member 19 which extends between the rear ends of the main horizontal frame members 11. Stub axles 20 extend outwardly from the cross member 19 and ground engaging wheels 21 are journalled for rotation upon these stub axles. Diagonal brace members 22 extend between the cross member 19 and a point adjacent the junction between members 18 and 16A, all of which gives a substantially rigid yet light weight base frame.

A forage box collectively designated 23 includes a floor panel 24 together with longitudinal strengthening members 25, 25A and forward and rear tubular cross members 26 and 27 respectively. Lugs 28 extend from transverse member 27 and pivot pins 29 engage these lugs and the upper ends of members 16A and then through members 25A thus pivoting the box transversely upon the frame 10 and it should be noted that this pivotal connection is substantially inboard of the rear extremity 30 of the base of the box 23. Due to the inclination of the portions 16A of the base frame, the box lies at a downwardly and forwardly inclined angle when in the lowermost position as shown in FIG. 1 and multi-stage piston and cylinder assemblies 31 are operatively connected between the frame cross member 19 and the underside of the box floor for raising and lowering the box in a vertical plane around pivot pin 29. The piston and cylinder assemblies 31 are connected to a source of hydraulic pressure on the towing vehicle (not illustrated) but as this is conventional, it is not believed necessary to illustrate same.

The box 23 includes the sides 32 and an open upper front intake portion 33, said intake portion extending rearwardly upon the upper side to adjacent a point indicated by reference character 34. The aforementioned spout 15 can therefore blow forage into the box 23 when in the position shown in FIG. 1.

The rear portion of the box includes rearwardly and downwardly sloping side portions 35 upon sides 32 and then substantially vertical rear sides 36 also upon sides 32 and this constitutes the discharge portion of the box. When in the position shown in FIG. 1, a hinged lid or closure assembly 37 closes the discharge portion. This hinged lid consists of an upper panel 38 and a lower panel 39 hinged together by adjacent edges as indicated by reference character 40 and this lid or closure assembly is in turn hinged transversely to the upper side of the box just forwardly of point 34. The lid assembly in FIG. 1 is shown in the open position for clarity but normally panel 38 would rest by gravity upon the edges 35 and panel 39 would hinge downwardly to rest upon the edges 36 thus closing off the discharge portion.

When in the position shown in FIG. 1, chaff or forage is blown into the box and due to the fact that the floor is sloping forwardly and downwardly, forward motion of the entire assembly behind the harvesting machine, causes the chaff or forage to gravitate to the front end of the box assembly.

Figure 3:
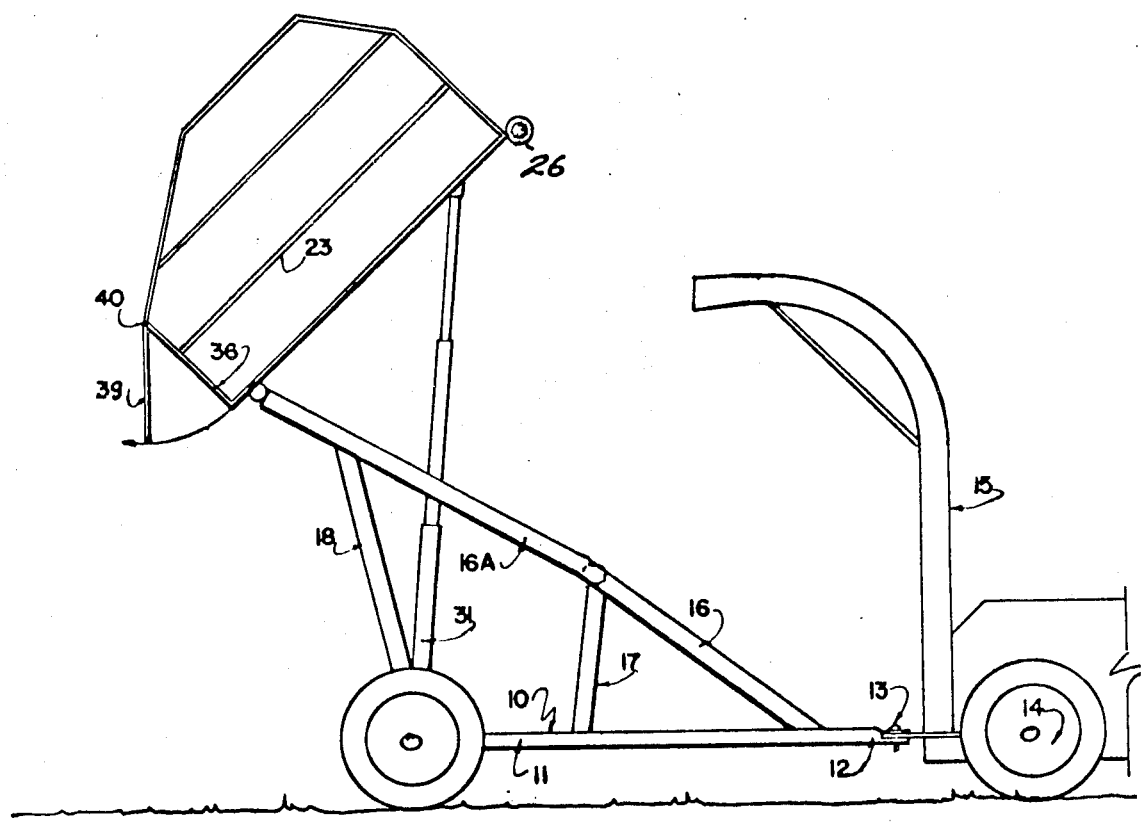
FIG. 3 is a view similar to FIG. 1 but showing the forage box in the uppermost or discharge position.

When it is desired to discharge same, the piston and cylinder assemblies 31 are extended as shown in FIG. 3 so that the chaff or forage upon the floor slides rearwardly and opens the door or closure panels so that it can be deposited in an associated truck (not illustrated). When in the fully raised position it will be noted that the lower panel 34 swings clear of the edges 36 and if the forage box is full, the load will also push open the other panel 38 so that the load can be discharged. The overhanging portion specifically designated 41, of the floor of the box, is situated within the truck during the unloading position to facilitate discharge of the load and slight forward and rearward movement of the entire assembly by means of the harvester will cause this overhanging portion to push the load within the truck to the other side thus tending to level same and to permit full discharge of the contents of the box into the truck. As soon as the discharge is complete, the piston and cylinder assemblies 31 are retracted thus returning the box to the position shown in FIG. 1 whereupon gravity closes the panels 38 and 39 thus closing off the discharge side of the forage box assembly.

Various modications may be constructed or performed within the scope of the inventive concept disclosed. Therefore what has been set forth is intended to illustrate such concept and is not for the purpose of limiting protection to any herein particularly described embodiment thereof.

What I claim as my invention is:

1. A forage box for attachment to harvesting machines and the like comprising in combination a base frame, ground engaging wheels supporting said frame at the rear thereof, hitch means on the front of said frame for attachment to the harvesting machine and the like, and a forage box, said box including a floor, a pair of sides, a front side and a rear side, means to pivotally mount said box upon said frame for pivotal motion of said box in a vertical plane, hydraulic piston and cylinder means operatively connected between said frame and said box for said pivotal action, said box having an open intake adjacent to said front side thereof and an open discharge on the said rear side thereof, and door means hinged to said box to close said discharge when said box is in the lowermost position and to open said discharge when said box is in the elevated position, said door means including a pair of panels, an upper panel and a lower panel, hinged together by adjacent edges and hinged to said box by the upper edge of said upper panel, said rear side including a lower portion extending upwardly at right angles from said floor and an upper portion extending upwardly and forwardly at an angle and towards the upper end of said open intake, said upper panel covering said upper portion when said door means is closed, said lower panel covering said lower portion when said door means is closed.

2. The forage box according to claim 1 in which the floor of said box lies at an inclined angle when in the lowermost position with the front end of said floor lower than the rear end thereof, whereby forage in said box gravitates towards the front side thereof when being loaded.

3. The forage box according to claim 1 in which said means to pivotally mount said forage box to said frame includes pivot pin means extending between the floor of said box and said frame, said pivot pin means being spaced forwardly of the rear edge of said floor thereby forming a rear overhanging portion.

4. The forage box according to claim 2 in which said means to pivotally mount said forage box to said frame includes pivot pin means extending between the floor of said box and said frame, said pivot pin means being spaced forwardly of the rear edge of said floor thereby forming a rear overhanging portion.

5. The forage box according to claim 1 in which the upper side of said frame inclines upwardly from the front end towards the rear end thereof, the floor of said box engaging said upper side of said frame when said box is in the lowermost position.

6. The forage box according to claim 2 in which the upper side of said frame inclines upwardly from the front end towards the rear end thereof, the floor of said box engaging said upper side of said frame when said box is in the lowermost position.

7. The forage box according to claim 3 in which the upper side of said frame inclines upwardly from the front end towards the rear end thereof, the floor of said box engaging said upper side of said frame when said box is in the lowermost position.

8. The forage box according to claim 4 in which the upper side of said frame inclines upwardly from the front end towards the rear end thereof, the floor of said box engaging said upper side of said frame when said box is in the lowermost position.

* * * * *